United States Patent [19]

Nakanishi

[11] Patent Number: 5,617,759

[45] Date of Patent: Apr. 8, 1997

[54] MECHANISM FOR MACHINING AND GRINDING TOOL FOR CONVERTING ROTATIONAL MOVEMENT INTO RECIPROCATING MOVEMENT

[75] Inventor: Eiichi Nakanishi, Kanuma, Japan

[73] Assignee: Nakanishi Dental Mfg. Co., Ltd., Tochigi-ken, Japan

[21] Appl. No.: 489,218

[22] Filed: Jun. 12, 1995

[30] Foreign Application Priority Data

Jun. 14, 1994 [JP] Japan .................................. 6-131652

[51] Int. Cl.⁶ ................................................ F16H 21/22
[52] U.S. Cl. ................................................ 74/44; 30/217
[58] Field of Search ........................... 74/44, 25; 30/217

[56] References Cited

U.S. PATENT DOCUMENTS

| | | | |
|---|---|---|---|
| 2,365,067 | 12/1944 | Gauld | 74/44 |
| 2,547,594 | 4/1951 | Ohlsson | 74/44 |
| 2,892,352 | 6/1959 | Saalfrank | 74/44 |
| 2,964,234 | 12/1960 | Loomis, III | 74/44 |

Primary Examiner—Charles A. Marmor
Assistant Examiner—David M. Fenstermacher
Attorney, Agent, or Firm—Malcolm B. Wittenberg

[57] ABSTRACT

A mechanism for a cutting or grinding tool for converting rotational movement into reciprocating movement contains a casing, a reciprocating member mounted within the casing for receiving and securing a tool to be inserted into a tool receiving opening of the reciprocating member, a shaft member rotatably mounted within the casing for rotation by a rotational driving force, a bearing member for rotatably carrying the shaft member, and a support member for carrying the reciprocating member for enabling reciprocating movement thereon. The reciprocating member and the shaft member are spaced apart so that a center axis of the reciprocating member and a center axis of the shaft member are offset. A connecting member is provided between the shaft member and the reciprocating member for interconnecting the shaft and reciprocating members for converting rotational movement of the shaft member into reciprocating movement of the reciprocating member. One end of the connecting member is slidably received and mounted in the shaft member at a position offset from the axis of the shaft member and the other end of the connecting member is slidably received and mounted in the reciprocating member at a position offset from the axis of the shaft member.

5 Claims, 2 Drawing Sheets

MECHANISM FOR MACHINING AND GRINDING TOOL FOR CONVERTING ROTATIONAL MOVEMENT INTO RECIPROCATING MOVEMENT

BACKGROUND OF THE INVENTION

This invention relates to a mechanism for converting a rotational movement from a rotary driving source, such as a motor used in a machining or grinding tool used for metal mold working, into a reciprocating movement.

In a machining or grinding tool for machining or grinding by a reciprocating movement of a cutting member or a grinding member, a cam, that is a plate or a cylinder having a sinuous edge or groove, is provided on a rotary member, and a protrusion or pin provided on a reciprocating member is slid in the groove in the rotary member or an end of the reciprocating member is slid along the edge of the rotary member for converting the rotational movement of the rotary driving source into a reciprocating movement.

However, with the above arrangement employing the cam, in which the end of the pin or the reciprocating member is slid along the edge or in the groove of the rotary member, the pin or the rotary member is worn out or heated and thus liable to destruction.

SUMMARY OF THE INVENTION

In view of the above problem of the prior art, it is a principal object of the present invention to provide a movement direction converting mechanism for a cutting tool and a grinding tool which is not susceptible to abrasion or destruction of component parts thereof during conversion of the rotational movement from the rotary driving source into a reciprocating movement.

The above and other objects of the present invention will become clear from the following description.

According to the present invention, there is provided a movement direction converting mechanism for a cutting tool and a grinding tool for converting a rotational movement into a reciprocating movement comprising a casing, a reciprocating member mounted within the casing for receiving and securing a tool to be inserted into a tool receiving opening of the reciprocating member, a shaft member rotatably mounted within the casing for rotation by a rotational driving force exerted by a rotary driving source, a bearing member for rotatably carrying the shaft member, and a support member for carrying the reciprocating member for enabling reciprocating movement thereon, the reciprocating member and the shaft member being spaced apart from each other so that a center axis of the reciprocating member and a center axis of the shaft member are offset relative to each other, a connecting member being provided between the shaft member and the reciprocating member for interconnecting the shaft and reciprocating members for converting rotational movement of the shaft member into reciprocating movement of the reciprocating member, one end of the connecting member being slidably received and mounted in the shaft member at a position offset from the axis of the shaft member and the other end of the connecting member is slidably received and mounted in the reciprocating member at a position offset from the axis of the shaft member.

PREFERRED EMBODIMENT OF THE INVENTION

Figure 1:
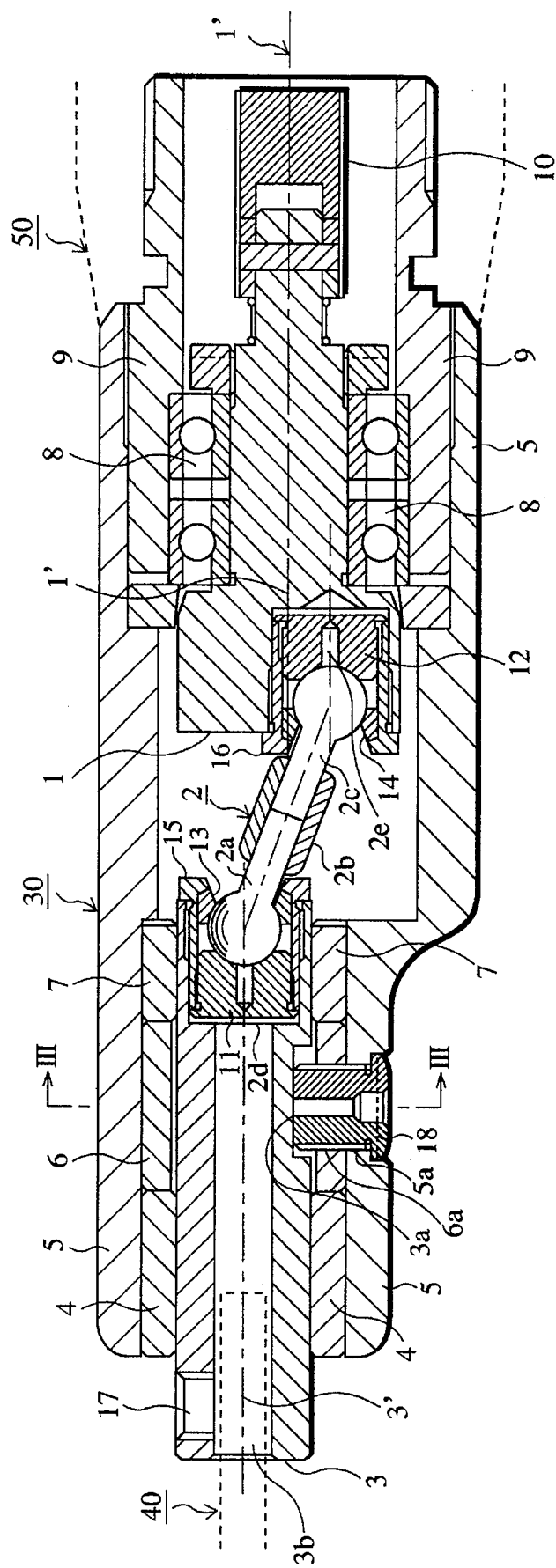
FIG. 1 is a longitudinal cross-sectional view showing a barrel portion of a cutting or grinding tool having a movement direction converting mechanism according to the present invention.

Referring to the drawings, a preferred illustrative embodiment of the present invention will be explained in detail.

A cutting tool or a grinding tool having the movement direction converting mechanism according to the present invention, has a grip portion 50 having therein an electric motor or a wiring, a barrel portion 30 connected to the grip portion 50 and housing therein a unit for converting the rotational movement of a rotary driving source, that is the above-mentioned electric motor, into a reciprocating movement, and a foremost portion 40 of a cutting edge or a grinding member connected to the barrel portion 30.

FIG. 1 is a partial longitudinal cross-sectional view showing the barrel portion 30 in which there are provided main members of the movement direction converting mechanism of the present invention, that is a shaft member a connecting member 2 and a reciprocating member 3.

The shaft member 1 has its rear end connected to a coupling 10, which in turn is connected to an electric motor, not shown, as a rotary driving source, so that the rotational movement is transmitted from the electric motor via the coupling 10 to the shaft member 1. The shaft member 1 has its mid portion pivotally mounted by a bearing 8 on a sheath 9 secured to a barrel casing 5. The foremost portion of the shaft member 1 has a recess at a position offset from its center axis 1', as shown in the partial enlarged cross-sectional view of FIG. 2. Within this recess is formed a receptacle 21 for the connecting member 2 as will be explained subsequently.

Figure 2:
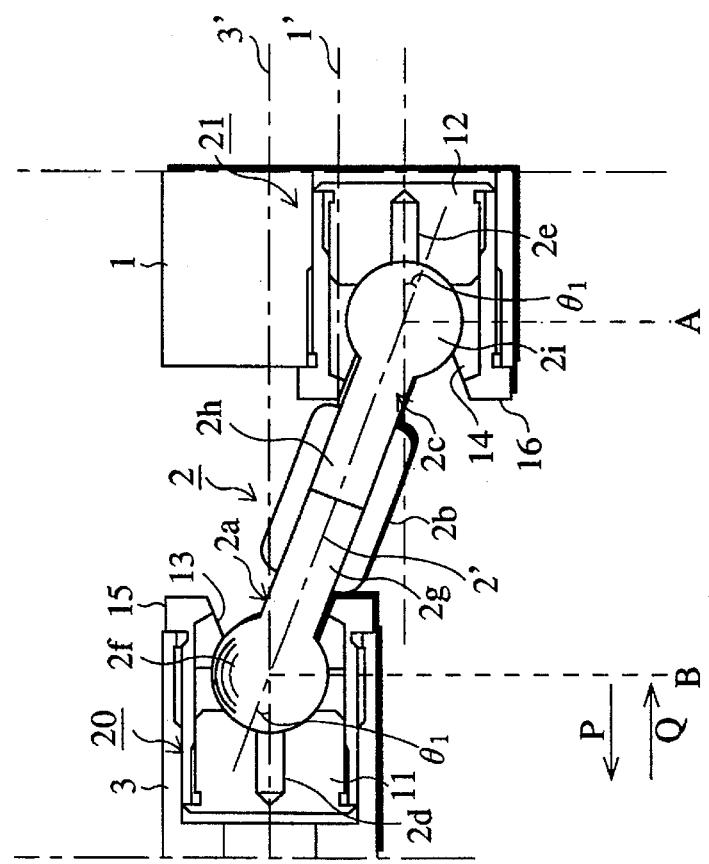
FIG. 2 is a partial enlarged cross-sectional view showing a connecting member interconnecting a member performing a rotational movement and a member performing a reciprocating movement.

The connecting member 2 is constituted by screwing connecting pieces 2a, 2c into a connecting ring 2b, as shown in FIGS. 1 and 2. Each of the connecting pieces 2a, 2c is constituted by shaft portions 2g, 2h and spherical portions 2f, 2i.

The connecting member 2 has its one end fitted and carried in the receptacle 21 of the shaft member 1. That is, the one end of the connecting member 2, that is the connecting piece 2c, is carried by a connecting piece receiving member 12 in which part of the spherical portion 2i of the connecting member 2 is fitted, a connecting piece stabilizing member 14 mounted about the spherical portion 2i and a stationary member 16 secured around the connecting piece receiving member 12 and the connecting piece stabilizing member 14. The other end of the connecting member 2, that is the spherical portion 2f, is similarly fitted and carried in a connecting member receptacle 20 of the reciprocating member 3.

A center axis 2' of the connecting member 2 is mounted at an angle $\theta_1$ with respect to a center axis 3' of the reciprocating member 3 and the center axis 1' of the shaft member 1. This angle $\theta_1$ is changed with rotation of the shaft member 1. If the connecting member 2 is mounted so that the maximum value of the angle $\theta_1$ exceeds 45°, the force acting on the connecting member 2 may become excessive to cause destruction of the component parts or obstruction of smooth reciprocating movement. Thus the maximum value of the angle $\theta_1$ is preferably not more than 45° and more preferably 15° to 30°. If the maximum value of the angle $\theta_1$ is set to 15° to 30°, the stroke of the reciprocating movement of the reciprocating member 3 may be selected to be larger while it becomes possible to achieve smooth non-constrained reciprocating movement.

The mid portions of the receiving members 11, 12 are formed with openings 2d, 2e, respectively, for further smoothing the sliding of the receiving members 11, 12 and the spherical portions 2f, 2i. That is, the contact area between the receiving members 11, 12 and the spherical portions 2f, 2i may be reduced by the provision of these openings 2d, 2e for improving the precision of the contact portions of the receiving members 11, 12.

Since the receiving members 11, 12 and the stabilizing members 13, 14 are slid in contact with the spherical portions 2f, 2i of the connecting member 2, these components are preferably formed of a material having self-lubricating properties and resistance against abrasion, such as oil-containing sintered engineering plastics manufactured by DUPONT under the trade name of VESPEL or similar oil-containing sintered metal.

The reciprocating member 3 is tubular in shape and has a center recess at its rear end, as shown in FIG. 1. In this recess is fitted the receiving member 20. A crescent-shaped cut-out 3a is formed in the outer periphery of the mid portion of the reciprocating member 3 to extend in the axial direction. The outer periphery of the foremost part of the reciprocating member 3 is formed with a screw hole 17 communicating with the inside of the reciprocating member 3 and the foremost part thereof is formed with a tubular opening 3b. Into this opening 3b is fitted the proximal portion 40 of the tool and secured by a set screw, not shown, inserted via the screw hole 17.

With the above-described reciprocating member 3, the foremost and rear portions thereof are slidably passed through tubular support members 4 and 7. A tubular member 6 not contacted with the outer periphery of the reciprocating ember 3 is held between the support members 4 and 7. The barrel casing 5 is secured around the support members 4, 7 and the tubular member 6.

Figure 3:
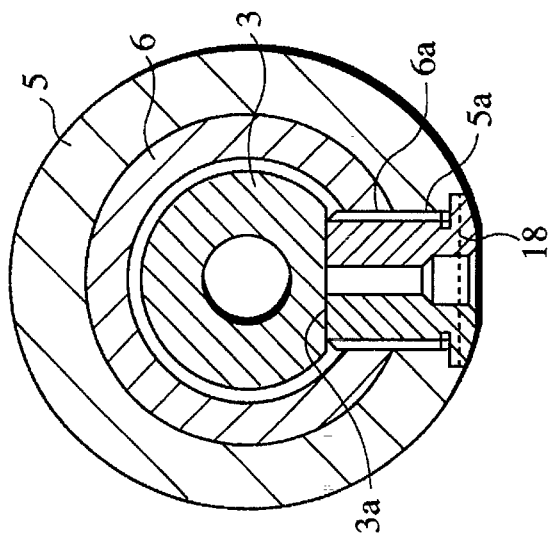
FIG. 3 is a cross-sectional view taken along line III—III in FIG. 1 and showing a rotation-stop pin for prohibiting rotation of a reciprocating member about its axis.

The support member 4 is provided at the back of the screw hole 17 so as not to sheath the screw hole 17, while the tubular member 6 and the barrel casing 5 are formed with openings 6a, 5a, respectively, to extend to reach the cut-out 3a of the reciprocating member 3, as shown in FIGS. 1 and 3. A rotation-stop pin 18 is inserted into these holes 5a, 6a to extend and reach the cut-out 3a. The rotation-stop pin 18 is secured so that its end portion is not contacted with the cut-out 3a and a small clearance is left in order to prevent rotation during reciprocating movement of the tubular reciprocating member 3. The support members 4, 6 are preferably formed of resin or metal which are the same as the material of the receiving members 11, 12 or the stabilizing members 13, 14.

Referring to FIGS. 1 and 2, the rotational direction converting operation for converting the rotational movement of the electric motor into a reciprocating movement of the reciprocating member 3 is explained.

When the electric motor is run in rotation so that its rotational movement is transmitted via the coupling 10 to the shaft member 1, the shaft member is rotated about its center axis 1'. The spherical portion 2i of the connecting member 2 is rotated about the axis 1' in operative association with the rotation of the shaft member 1, as shown in FIG. 2.

The spherical portion 2i at one end of the connecting member 2 is mounted at a position offset with respect to the axis 1'. On the other hand, the spherical portion 2f at the other end of the connecting member 2 is mounted at a position offset with respect to the axis 1' at the rear end of the reciprocating member 3. In addition, the shaft member 1 is rotated but is not slid in the fore-and-aft direction. On the other hand, the reciprocating member 3 is mounted for sliding in the fore-and-aft direction. Consequently, when the shaft member 1 makes one complete revolution, the angle $\theta_1$ which the axis 2' of the connecting member 2 makes with the axis 3' of the reciprocating member 3 is varied within a certain range. With such variation in the angle $\theta_1$, the spherical portion 2f of the connecting member 2 is reciprocated along with the reciprocating member 3 in a direction indicated by arrows P, Q.

If the angle $\theta_1$ is maximum in FIG. 2, the angle becomes gradually smaller with rotation of the shaft member 1. Simultaneously, the spherical portion 2f of the connecting member 2 is moved as indicated by arrow P, beginning from the position indicated by a broken line B, while thrusting the reciprocating member 3. When the shaft member 1 is rotated by 180°, the angle $\theta_1$ becomes minimum with the length of extension of the reciprocating member 3 becoming maximum. When the shaft member 1 continues its rotation, the angle $\theta_1$ is gradually increased, at the same time as the spherical portion 2f of the connecting member 2 pulls the reciprocating member 3 backwards and is moved in the direction shown by arrow Q. When the shaft member 1 completes its 360° rotation, the angle $\theta_1$ again becomes maximum, as shown in FIG. 2, with the length of extension of the reciprocating member 3 becoming minimum.

In this manner, the rotational movement of the shaft member 1 is converted via the connecting member 2 into a reciprocating movement of the reciprocating member 3. A variety of working operations for the metal mold or the like may be performed by the cutting edge or the grinding member carried by the reciprocating member 3.

Although the present invention has been described with reference to the preferred embodiment, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A movement direction converting mechanism for a cutting tool and a grinding tool for converting a rotational movement into a reciprocating movement comprising a casing, a reciprocating member mounted within the casing for receiving and securing a tool to be inserted into a tool receiving opening of the reciprocating member, a shaft member rotatably mounted within said casing for rotation by a rotational driving force exerted by a rotary driving source, a bearing member for rotatably carrying said shaft member, and a support member for carrying said reciprocating member for enabling reciprocating movement thereon, said reciprocating member and the shaft member being spaced apart from each other so that a center axis of said reciprocating member and a center axis of said shaft member are offset relative to each other, a connecting member being provided between the shaft member and the reciprocating member for interconnecting the shaft and reciprocating members for converting rotational movement of the shaft member into reciprocating movement of said reciprocating member, one end of said connecting member being slidably received and mounted in said shaft member at a position offset from the axis of the shaft member and the other end of said connecting member being slidably received and mounted in said reciprocating member at a position offset from the axis of the shaft member, characterized in that said connecting member has two connecting pieces each of which has shaft portions, said connecting pieces being abutted to each other, a tubular member enclosing each outer periphery of the shaft portions for connecting and securing said shaft portions of the connecting pieces.

2. A movement direction converting mechanism for a cutting tool and a grinding tool for converting a rotational movement into a reciprocating movement comprising a casing, a reciprocating member mounted within the casing for receiving and securing a tool to be inserted into a tool receiving opening of the reciprocating member, a shaft member rotatably mounted within said casing for rotation by a rotational driving force exerted by a rotary driving source, a bearing member for rotatably carrying said shaft member, and a support member for carrying said reciprocating member for enabling reciprocating movement thereon, said reciprocating member and the shaft member being spaced apart from each other so that a center axis of said reciprocating member and a center axis of said shaft member are offset relative to each other, a connecting member being provided between the shaft member and the reciprocating member for interconnecting the shaft and reciprocating members for converting rotational movement of the shaft member into reciprocating movement of said reciprocating member, one end of said connecting member being slidably received and mounted in said shaft member at a position offset from the axis of the shaft member and the other end of said connecting member being slidably received and mounted in said reciprocating member at a position offset from the axis of the shaft member, characterized in that a groove is formed on an outer periphery of the reciprocating member and a fitting member passed through said support member and engaged in said groove being provided for inhibiting rotation of the reciprocating member.

3. The movement direction converting mechanism as claimed in either claim 1 or 2 wherein said one end and said other end of said connecting member are substantially spherical in shape, a first receptacle for slidably receiving and mounting said one end of said connecting member at an offset position with respect to the center axis of the shaft member being provided at one end of said shaft member, said first receptacle including a first receiving member having a curved surface for slidably engaging with said one end of the connecting member, a second receptacle for slidably receiving and mounting said other end of said connecting member at an offset position with respect to the center axis of the shaft member being provided at the other end of said reciprocating member, said second receptacle including a second receiving member having a curved surface for slidably engaging with said other end of the connecting member.

4. The movement direction converting mechanism as claimed in claim 3 wherein the curved surface of said first receiving member has an opening and the curved surface of said second receiving member has an opening.

5. The movement direction converting mechanism as claimed in any of claims 1, 2, 3 or 4 wherein an angle which the center axis of the connecting member makes with the center axis of the reciprocating member and the center axis of the shaft member has a maximum value of 15° to 45°.

* * * * *